3 Sheets--Sheet 1.

H. H. HERRICK.

Carpet-Sweepers.

No. 5,875

Reissued May 19, 1874

WITNESSES
G. H. McGrew
J. B. Sanford

H. H. Herrick
INVENTOR.
Assignees
John J. Haley
Henry C. Morse
by J. E. Maynadier
Atty.

3 Sheets--Sheet 2

H. H. HERRICK.

Carpet-Sweepers.

No. 5,875 Reissued May 19, 1874.

WITNESSES.
Geo. H. McGrew
J. B. Scanford

H. H. Herrick
INVENTOR.
Assignees
John J. Haley
Henry C. Morse
by J. E. Maynadier
Atty 3 Sheets--Sheet 3.

H. H. HERRICK.

Carpet-Sweepers.

No. 5,875

Reissued May 19, 1874.

WITNESSES.
Geo. H. McGrew
J. B. Sanford

H. H. Herrick
INVENTOR
Assignees
John J. Haley
Henry C. Morse
by J. E. Maynadier
Atty

UNITED STATES PATENT OFFICE.

EDWIN S. HOVEY, OF BOSTON, MASSACHUSETTS, (ADMINISTRATOR OF H. H. HERRICK, DECEASED,) ASSIGNOR, BY MESNE ASSIGNMENTS, TO JOHN J. HALEY AND HENRY C. MORSE.

IMPROVEMENT IN CARPET-SWEEPERS.

Specification forming part of Letters Patent No. 21,233, dated August 17, 1858; reissue No. 1,079, dated November 20, 1860; extended seven years; reissue No. 5,875, dated May 19, 1874; application filed January 6, 1873.

*To all whom it may concern:*

Figure 1:
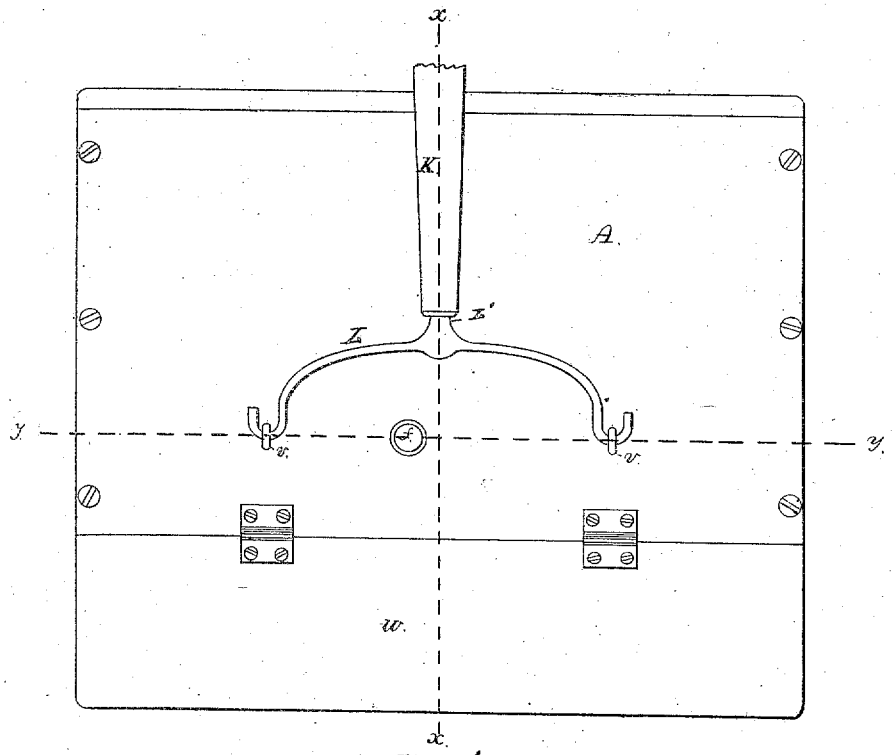
Figure 4:
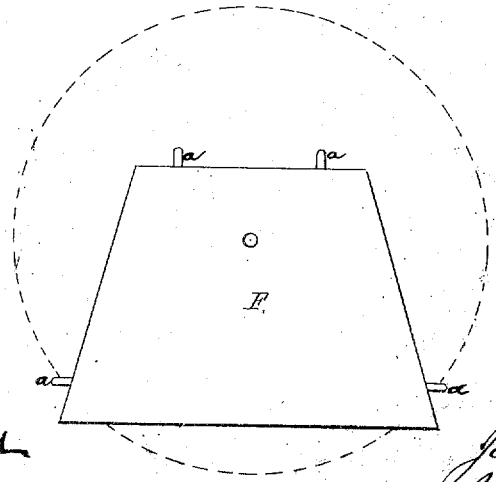
Figure 2:
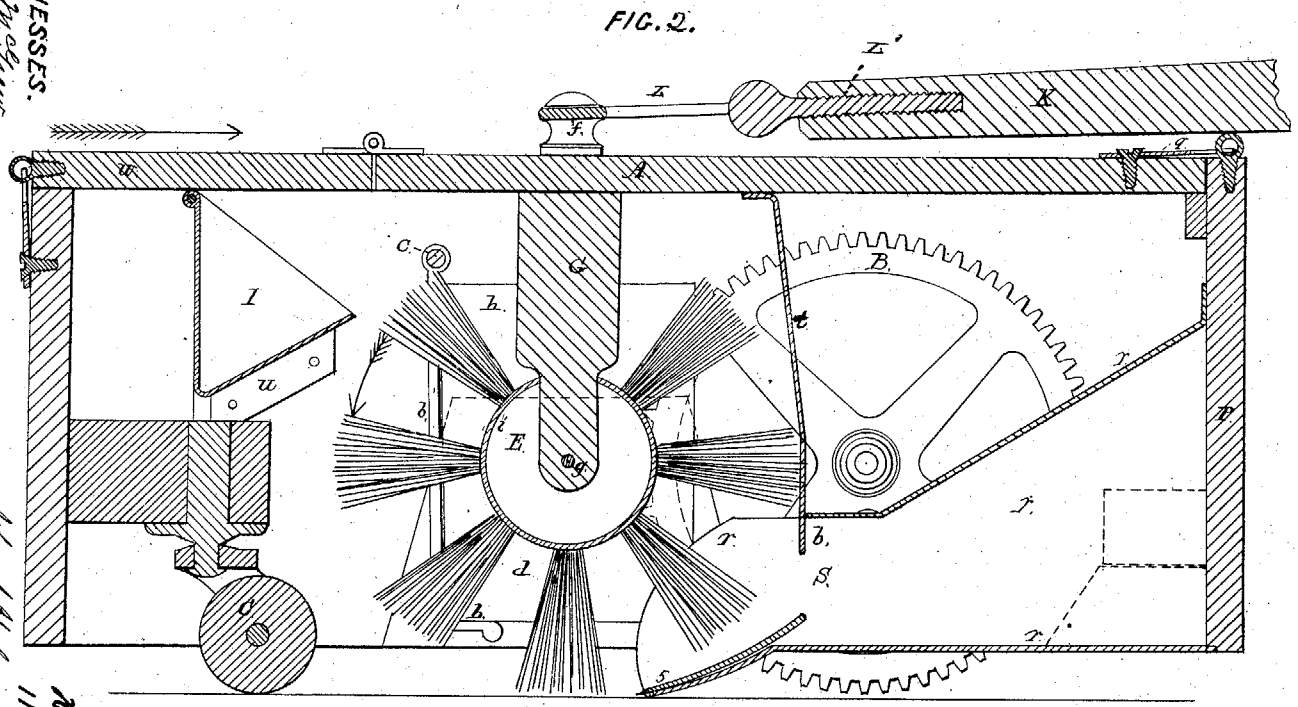
Figure 3:
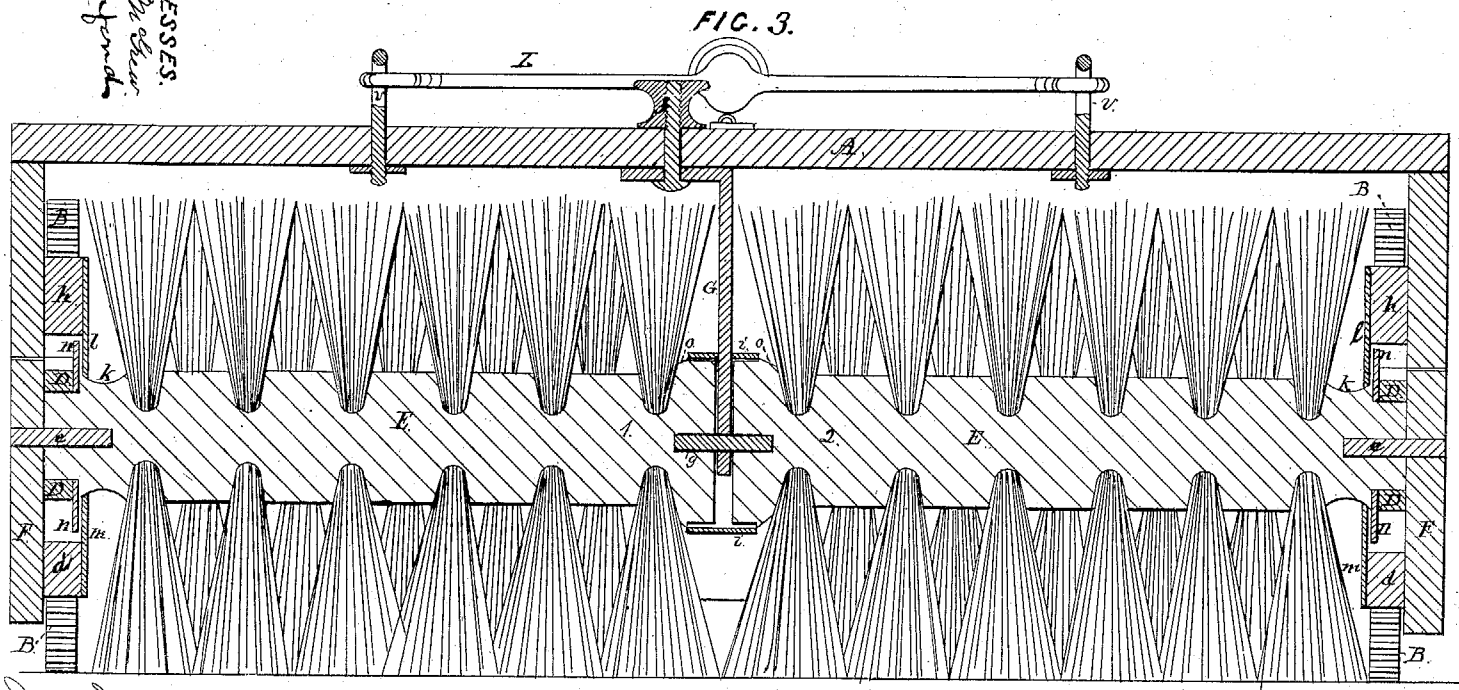

Be it known that HIRAM H. HERRICK, deceased, did invent an Improved Carpet-Sweeper, (for which Letters Patent were issued August 17, 1858, and renewed August 16, 1872, and of which JOHN J. HALEY, of Newton, and HENRY C. MORSE, of Boston, in the State of Massachusetts, are now sole owners,) of which the following is a specification:

In the drawings, Figure 1 is a plan; Fig. 2, a vertical section on the line *x x* of Fig. 1; Fig. 3, a vertical section on the line *y y* of Fig. 1 and Fig. 4, for illustration.

A is a box, left open at the bottom in order that the brush may reach the carpet or floor to be swept. It is supported by two cogged wheels, B, one on each side, and a swiveling-caster, C, at the rear end of it. The cogged wheels B B are not only supporting-wheels, but also driving-wheels, the cogs upon them serving the double purpose of actuating the brush, (by means of the cogged wheels D on the brush-shaft E,) and also of insuring so firm a hold of this wheel B upon the surface to be swept as to practically obviate all danger of its sliding, which is objectionable, as the proper revolution of the brush depends upon the revolution of its driving-wheel. Both the wheels B B are not essential, as one of them may be dispensed with when the brush is short; but when so large a brush is used that more power is required than can be got from one driving-wheel attached at one end of the shaft, both driving-wheels are used, one at each end of the brush-shaft; but in this case the machine cannot be turned without dragging one of the wheels on the carpet unless the brush is made in two parts, marked 1 and 2 in Fig. 3. When so made a central bearing (shown at G and *g*) is of course requisite. The journals *e* of the brush-shafts E have their boxes in a removable block, F, (detached in Fig. 4,) which is so constructed that it can be readily detached from and inserted in its place, the pins *a a a a* entering corresponding grooves in the edge of the box and the hook *b*, Fig. 2, which is pivoted at *c*, and hooks over a part, *d*, of the piece F, holding the piece F in its place, but in such a manner that it can be readily removed and replaced. A band, *i*, of sheet metal encircles the parts 1 and 2 where they come together, a slot being cut in it for the piece G to pass through, and serves to keep the dirt from the journals *g*. To protect the bearings at *e* and the cogged wheel D, two projections, *d* and *h*, are secured to the inner side of the end of the box, which embrace the wheel D, for the greater part of its circumference, having only so much of it exposed as is necessary to engage with the wheel B, while plates *l* and *m* of sheet metal attached to the inner sides of the projections *d* and *h* form a partition between the inner face of the cog-wheel D and the end of the brush. An annular metal plate, *n*, attached to the shaft revolves close to the partition-plates *l* and *m*, and diminishes still more the space between the plates *d* and *h* and the brush-shaft. To prevent threads and similar things from entangling in the gears or journals, a groove, *k*, is formed around the shaft, and the ends of 1 and 2 are enlarged so as to form an inclined surface at *o*. These inclines guide anything of this nature down upon the smaller part of the shaft and away from the bearings. The front end *p* of the box A is made detachable, and is secured to the top by a hook and staple at *g*. To the inside of the end P is attached a sheet-metal box, *r*, the whole sliding in and out after the manner of a drawer (when the hook *q* is out of the staple) on supports projecting from the side pieces of the box A, indicated by dotted lines in Fig. 2. This box *r* has a spring-lip at 5, projecting so far below the bottom of the box *r* that its edge is kept in contact with the surface of the carpet or floor, so that the dirt is brushed up over the inclined surface of the lip 5 and into the box *r*. A screen, *t*, extends across the machine, and is attached to the top of the box A, hanging down from it, with its lower edge resting against the sides of the box *r*, so as to form the throat S. This piece *t* serves as a doctor or clearer for the brush. Any lighter particles not received by box *r* are carried to the box I near the rear end of machine, which rests on cleats *u*, attached to the sides of the box A, and which may be removed by opening the hinged lid *w* in the top of the box. The handle K is attached by means of the bail L, which has a screw, L′, projecting from it, so that the handle can be readily attached for use and detached for convenience in packing. The operation is clear without farther description.

What we claim as the invention of said HERRICK is—

1. The brush-shaft provided with the grooves *k*, substantially as and for the purpose set forth.

2. The brush-shaft provided with the inclined surface *o*, substantially as and for the purpose set forth.

3. The wheel D, in combination with the plates *l*, *m*, and *n*, substantially as and for the purpose specified.

4. The spring-lip 5, in combination with the dust-pan *v*, arranged to project beyond the edge of said pan, substantially as and for the purpose described.

5. In a carpet-sweeper, the brush E, formed of the parts 1 and 2, in combination with the dust-pan *r*, substantially as and for the purpose set forth.

6. The combination of the cog-wheels B and D with the frame of a carpet-sweeper and its brush, substantially as described, so that the cogs upon the former shall perform the double function above specified.

7. The clearer *t*, attached to the box A of a carpet-sweeper, in combination with the brush E and dust-pan I, substantially as and for the purpose specified.

8. The block F, constructed substantially as described, in combination with the box and brush-shaft of a carpet-sweeper, as and for the purpose set forth.

9. In combination with a carpet-sweeper, the bail L, having the screw L′ projecting from it, as shown, for the purpose specified.

JOHN J. HALEY.
HENRY C. MORSE.

Witnesses:
A. H. SPENCER,
E. PORTER DYER, Jr.